United States Patent
Druist et al.

(10) Patent No.: US 8,169,754 B2
(45) Date of Patent: *May 1, 2012

(54) DEDICATED NONCORROSIVE SMEAR DETECTOR

(75) Inventors: David P. Druist, Santa Clara, CA (US); David J. Seagle, Morgan Hill, CA (US); Jila Tabib, Los Gatos, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 1157 days.

This patent is subject to a terminal disclaimer.

(21) Appl. No.: 12/006,296

(22) Filed: Dec. 31, 2007

(65) Prior Publication Data

US 2009/0168268 A1    Jul. 2, 2009

(51) Int. Cl.
    *G11B 5/33* (2006.01)
(52) U.S. Cl. ..................... 360/324.2
(58) Field of Classification Search ............... 360/324.2, 360/324.12, 319, 314, 324.11
    See application file for complete search history.

(56) References Cited

U.S. PATENT DOCUMENTS

| | | | |
|---|---|---|---|
| 5,494,473 A | 2/1996 | Dupuis et al. | |
| 5,772,493 A | 6/1998 | Rottmayer et al. | |
| 6,230,389 B1 | 5/2001 | Zhu | |
| 6,699,102 B2 | 3/2004 | Reiley et al. | |
| 6,736,704 B2 | 5/2004 | Kennedy et al. | |
| 6,786,803 B2 | 9/2004 | Crawforth et al. | |
| 6,793,557 B2 | 9/2004 | Bunch et al. | |
| 6,857,937 B2 | 2/2005 | Bajorek | |
| 6,922,884 B2 | 8/2005 | Guo et al. | |
| 6,949,004 B1 | 9/2005 | Broussalian et al. | |
| 7,014,530 B2 | 3/2006 | Kasiraj et al. | |
| 7,026,823 B2* | 4/2006 | Takanuki et al. | 324/525 |
| 7,137,190 B2 | 11/2006 | Hsiao et al. | |
| 7,206,172 B2 | 4/2007 | Ding et al. | |
| 2003/0020467 A1 | 1/2003 | Kasahara et al. | |
| 2003/0174834 A1* | 9/2003 | Kida | 379/428.01 |
| 2004/0179307 A1 | 9/2004 | Burbank et al. | |
| 2004/0239343 A1* | 12/2004 | Takanuki et al. | 324/696 |
| 2007/0123149 A1 | 5/2007 | Bunch et al. | |
| 2007/0123150 A1 | 5/2007 | Bunch et al. | |
| 2008/0251099 A1* | 10/2008 | Sawada et al. | 134/1 |
| 2008/0273265 A1* | 11/2008 | Gee et al. | 360/234.3 |

FOREIGN PATENT DOCUMENTS

EP    1732064    12/2006
WO    WO-9502241  1/1995

OTHER PUBLICATIONS

Jiang, et al., "On the Advanced Lapping Process in the Precision Finishing of Thin-Film Magnetic Recording Heads for Rigid Disc Drives", *Seagate Technology*, (Jan. 15, 2003),1.
Fujitsu, et al., "Automatic ELG Lapping System", *Fujitsu Automation Limited*, (1998),1-2.
Gatzen, et al., "Precision Machining of Rigid Disk Head Sliders", *IEEE Transactions on Magnetics*, vol. 32, No. 3, (May 1996),1.
Metallographic, et al., "Data Storage Magnetic Head Lapping Plates", *PACE Technologies*, (2006), 1-3.

* cited by examiner

Primary Examiner — Allen Cao

(57) ABSTRACT

A disk drive head slider for a magnetic disk drive is provided. The head slider includes a tunnel magnetic resistance device for reading data on a magnetic disk and a dedicated noncorrosive smear detector for measuring resistance wherein the resistance corresponds to a level of smear associated with the head slider.

18 Claims, 9 Drawing Sheets

800

Locate a back edge of a first shield between an air bearing surface (ABS) and a deep gap mill surface (DGMS).
805

Establish a first lead and a second lead separated by a gap, wherein the first and the second lead are configured to enable electrically conductive material to be coupled therewith.
810

Bridge the gap by a second shield, wherein a back edge of the second shield is located between the ABS and the DGMS.
815

```
┌─────────────────────────────────────┐
│  Measure a resistance value associated with │
│  a dedicated noncorrosive smear detector    │
│  associated with a tunnel magnetic          │
│  recording device.                          │
│  905                                        │
└─────────────────────────────────────┘
                  │
                  ▼
┌─────────────────────────────────────┐
│  Determine a smear index value associated   │
│  with the tunnel magnetic recording device  │
│  while a lapping process is being performed │
│  wherein the smear index value is based     │
│  on the resistance value of the dedicated   │
│  noncorrosive smear detector.               │
│  910                                        │
└─────────────────────────────────────┘
                  │
                  ▼
┌─────────────────────────────────────┐
│  Compare the smear index value to a threshold │
│  smear index value.                           │
│  915                                          │
└─────────────────────────────────────┘
                  │
                  ▼
┌─────────────────────────────────────┐
│  In response to the smear index value being │
│  greater than the threshold value, determine if │
│  the lapping process requires an adjustment.   │
│  920                                           │
└─────────────────────────────────────┘
```

FIG. 9

DEDICATED NONCORROSIVE SMEAR DETECTOR

TECHNICAL FIELD

The field of the present invention relates to disk drive data storage devices. More particularly, embodiments of the present invention are related to sliders for hard disk drives.

BACKGROUND ART

Direct access storage devices (DASD) have become part of every day life, and as such, expectations and demands continually increase for better performance at lower cost. To meet these demands, the mechano-electrical assembly in a DASD device, specifically the Hard Disk Drive (HDD) has evolved to meet these demands.

In order for an HDD to hold more data, advances in the disk media in which the data is written as well as the magnetic transducer for writing and reading the data have undergone major advances in the past few years.

The magnetic transducer used in the first hard disk drives was based on an inductive principle for both writing and reading data to and from the disk media. For writing data into the disk media, electric current is passed through an electrically conductive coil, which is wrapped around a ferromagnetic core. The electric current passing through the write coil induces a magnetic field in the core, which magnetizes a pattern of localized spots in the disk media as the disk media passes close to the magnetic transducer. The pattern of magnetized spots in the media forms data that can be read and manipulated by the HDD. To read this data, the disk passes the magnetized spots of written data close to the same magnetic core used for writing the data. The magnetized spots passing close to the ferromagnetic core induce a magnetic field in the core. The magnetic field induced in the ferromagnetic core induces an electric current in a read coil similar to the write coil. The HDD interprets the induced electric current from the read coil as data.

Magnetoresistance (MR) transducers replaced inductive read heads. An MR transducer reads written data in disk media, still in the form of magnetized spots, by sensing the change in electrical resistance of a magneto-resistive element in the MR transducer. An electric current is passed through an MR transducer. The current typically traverses the MR transducer perpendicularly to the direction of disk rotation and in the plane of the MR films.

Advances in the magneto-resistive element materials have made the MR transducer more sensitive and is now referred to as a giant magnetoresistance (GMR) transducer. As with the MR transducer, the current typically traverses the GMR transducer perpendicularly to the direction of disk rotation and in the plane of the GMR films, and the data is written in the disk media with an inductive write transducer.

Further advances in magneto-resistive reading have given rise to tunneling magnetoresistance (TMR) magnetic transducers. The current traversing the TMR magnetic transducer is typically parallel to the direction of disk rotation, and perpendicular to the TMR films. A thin insulator barrier is placed between two ferromagnetic conductors. Electrons tunnel through the thin insulator barrier. The resistance of the electrons tunneling through the thin insulator barrier will change as the magnetic domain structure within the two ferromagnetic conductors react to the presence of a magnetized spot in the disk media. In this manner, data can be read that has been magnetically written in the disk media.

Continuing advances are being made in the TMR magnetic transducer design and fabrication methods as more demands are made on the performance of HDDs using TMR magnetic transducers.

SUMMARY

Embodiments of the present invention include a head slider for a magnetic disk drive. In one embodiment of the invention, the head slider includes a tunnel magnetic resistive device for reading data on a magnetic disk and a dedicated noncorrosive smear detector for measuring resistance wherein the resistance corresponds to a level of smear associated with the disk drive head slider.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 8 is a flow diagram of an example method for constructing a dedicated noncorrosive smear detector in accordance with embodiments of the present invention.

FIG. 9 is a flow diagram of an example method for determining a smear level associated with a slider in accordance with embodiments of the present invention.

DETAILED DESCRIPTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected within. The discussion will then focus on embodiments of the invention that provide a dedicated smear detector in a slider that has a portion exposed on an ABS of a slider that is noncorrosive. The smear detector determines the smear of a slider while the slider is being lapped. The discussion will then focus on embodiments of this invention that provide a method for determining smear. In one embodiment, the dedicated smear detector enables real-time measurement and control of lapping. The present invention also provides a method for determining when a lapping process exceeds a threshold smear level. Additionally, the present invention provides a method for constructing a dedicated noncorrosive smear detector.

Although embodiments of the present invention will be described in conjunction with a hard disk drive slider, it is understood that the embodiments described herein are useful outside of the art of disk drive sliders, such as devices requiring high frequency transmission between two devices that have relative motion.

OVERVIEW

Figure 1:
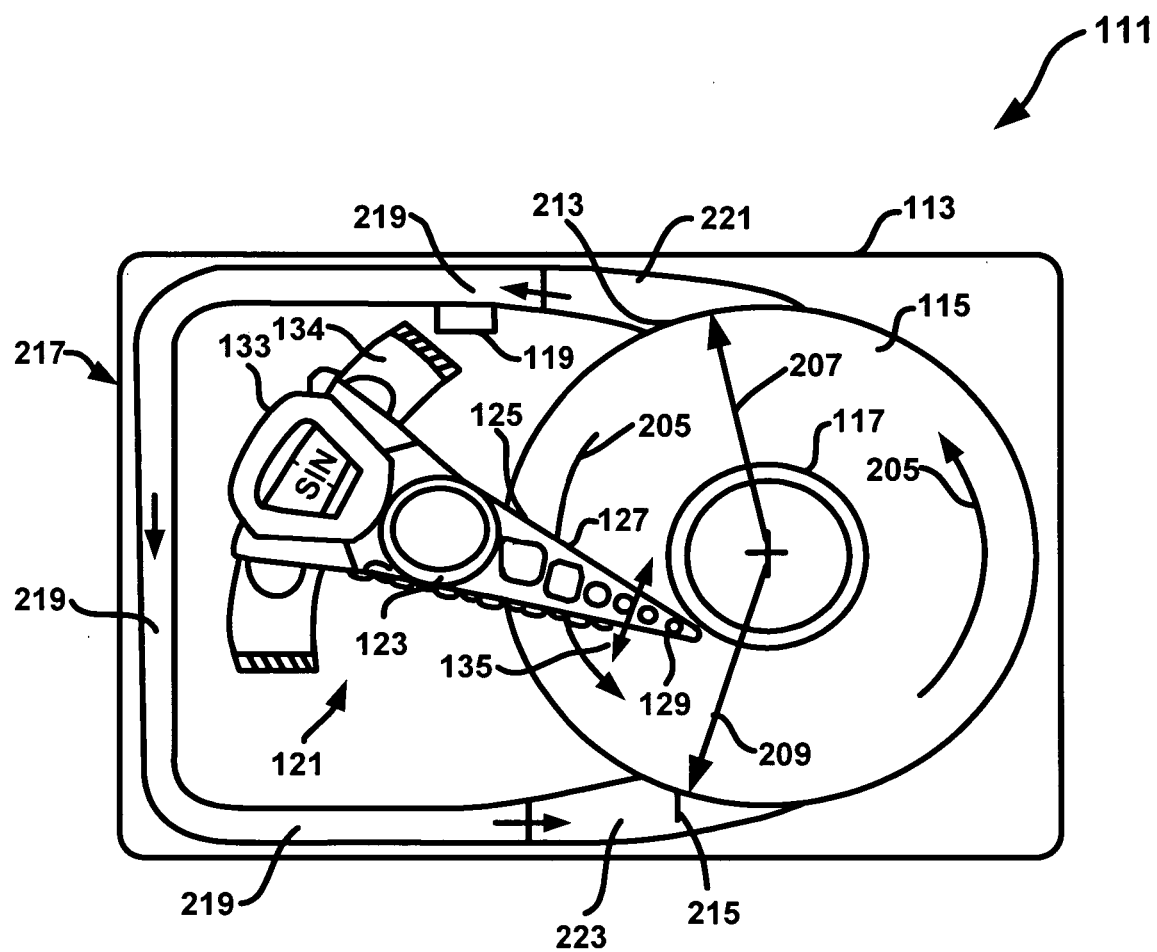
FIG. 1 is a schematic, top plane view of a hard disk drive in accordance with one embodiment of the present invention.

With reference now to FIG. 1, a schematic drawing of one embodiment of an information storage system comprising a magnetic hard disk file or drive 111 for a computer system is shown. Drive 111 has an outer housing or base 113 containing a disk pack having at least one media or magnetic disk 115. A spindle motor assembly having a central drive hub 117 rotates the disk or disks 115.

An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered electrical lead suspension (ELS) 127 (load beam removed). It should be understood that ELS 127 may be, in one embodiment, an integrated lead suspension (ILS) that is formed by a subtractive process.

In another embodiment, ELS 127 may be formed by an additive process, such as a Circuit Integrated Suspension (CIS). In yet another embodiment, ELS 127 may be a Flex-On Suspension (FOS) attached to base metal or it may be a Flex Gimbal Suspension Assembly (FGSA) that is attached to a base metal layer.

The ELS may be any form of lead suspension that can be used in a Data Access Storage Device, such as a HDD. A magnetic read/write transducer or head is mounted on a slider 129 and secured to a flexure that is flexibly mounted to each ELS 127. The read/write heads magnetically read data from and/or magnetically write data to disk 115. The level of integration called the head gimbal assembly is the head and the slider 129, which are mounted on suspension 127. The slider 129 is usually bonded to the end of ELS 127

ELS 127 has a spring-like quality, which biases or presses the air-bearing surface of the slider 129 against the disk 115 to cause the slider 129 to fly at a precise distance from the disk. The ELS 127 has a hinge area that provides for the spring-like quality, and a flexing interconnect that supports read and write traces through the hinge area. A voice coil 133, free to move within a conventional voice coil motor magnet assembly 134 (top pole not shown), is also mounted to arms 125 opposite the head gimbal assemblies.

Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and move in unison with one another, unless drive 111 uses multiple independent actuators (not shown) wherein the arms can move independently of one another.

Lapping is a process used to define the base-plane of a slider's air bearing surface (ABS). Lapping is also used to define the stripe height of the recording sensors within the sliders. In most cases, lapping is performed by polishing sliders on diamond-embedded tin plates. The slider's magnetic sensors are vulnerable to damage during the lapping process.

For example, lapping debris (e.g., plate material, slider material, etc.) generated during lapping can become embedded in the sensor and cause electrical short circuits. It is often called "smearing" when lapping debris contaminates the sensor.

Depending on the quality of the lapping process, the degree of "smearing" can vary drastically. For example, larger diamonds and scratches on the lapping plate can cause more severe smearing than clean plates and finer lapping material. If the degree of smearing is slight, it can be removed in post-lapping-processing, such as ion-beam-etching and/or cleaning. However, if the smearing is heavy, post processing will not adequately remove the smearing which can lead to head reliability problems.

For lapping GMR sensors, the GMR sensors themselves are often used as the smear detectors. As the GMR sensors are removed by lapping, its intrinsic resistance value should increase monotonically. Smearing caused by lapping will reduce the measured resistance values. Therefore any drops in the measured GMR resistance values are caused by smearing. But since the dimension of the GMR sensors change with every product generation, their sensitivity as the smear detectors changes too.

For TMR sensors, the resistance values are mainly determined by a tunnel barrier which is only a few Angstrom thick. Therefore, they are extremely sensitive to lapping smearing. Even the finest lapping will generate very noise resistance readings, even though the smearing may be cleaned up in the post-lapping processing. The TMR sensors may be so sensitive that they can not differentiate fine lapping from rough ones. Therefore, it is necessary to have a dedicated smearing detector for quality control of the lapping of the TMR sensors.

Embodiments of the present invention include a dedicated smear detector formed within a slider that enables a real-time determination of the degree of smear associated with a single slider or a plurality of sliders during a lapping process. Thus, a dedicated smear detector used for quality control of the lapping of the TMR sensors was created. Additionally, the sensitivity of these dedicated smear detectors remains constant. In one embodiment, the dedicated smear detector is formed within sliders comprising tunneling magnetic recording (TMR) sensors.

Additionally, it is desirable to have a dedicated smear detector which has noncorrosive material exposed to the ABS, since during the fabrication process of a dedicated smear detector, corrodible metal may be left exposed. For example, in manufacturing a dedicated smear detector, a carbon overcoat is placed upon an air bearing. When the air bearing is milled out, the carbon overcoat is also milled out, and nickel iron is left exposed. Eventually, over the lifetime of the HDD, the corrodible metal will start to rust. Particles may then slough off of the rusted material and land in the HDD, causing head reliability problems. Thus, one embodiment of the present invention provides for a dedicated smear detector which has noncorrosive material exposed to the ABS.

For brevity and clarity, embodiments of the present invention will be discussed herein as a dedicated noncorrosive smear detector with noncorrosive material. In one embodiment, a noncorrosive part of the dedicated noncorrosive smear detector is exposed at the ABS. Thus, the embodiments of the present invention may monitor the lapping process while milling away the air bearing surface, and still be left with a portion of the dedicated noncorrosive smear detector which is noncorrosive and exposed to the ABS. Additionally, corrosive material may be coupled with noncorrosive material, such as leads, of the dedicated noncorrosive smear detector. However, this corrosive material never becomes exposed because it is buried below the deep gap mill surface. In one embodiment, the dedicated noncorrosive smear detector is formed within sliders comprising tunneling magnetic recording (TMR) sensors.

In one embodiment of the invention, the dedicated noncorrosive smear detector is used to monitor the level of smear during a lapping process and determine a "smear index" value associated with a slider or a plurality of sliders including TMR sensors. The smear index can be compared to a threshold smear value and when the smear index exceeds the threshold smear value, it can be determined that the lapping process should be adjusted, such as reducing the lapping pressure, speed, or replacing the lapping plates.

By monitoring the level of smear in real time with respect to the lapping process, fewer parts are discarded due to smearing because the lapping process can be adjusted to keep the smear index below the threshold value. Embodiments of the present invention monitor and provide instant feedback about the quality of the lapping process which enables improved process control.

Since the dedicated noncorrosive smear detector materials are being removed during the lapping process, the intrinsic resistance of the dedicated noncorrosive smear detector increases monotonically. However, smearing can cause current shunting across the barrier and resistance will drop across the barrier once smearing occurs, essentially creating an electrical short in the sensor. Since the TMR sensor barrier is sometimes as small as a few Angstrom, the resistance of the TMR sensor fluctuates wildly, even during the best of lapping conditions.

Embodiments of the present invention include a dedicated noncorrosive smear detector for monitoring smearing where the sensor is not overly sensitive to smearing as is the TMR sensor. For example, embodiments of the present invention provide a dedicated noncorrosive smear detector with a barrier thickness of approximately 10 nanometers, which greatly reduces the smearing sensitivity compared to the TMR sensor.

The dedicated noncorrosive smear detector measures resistance to enable the determination of a "smear index" value. In one embodiment of the invention, the structure of the dedicated noncorrosive smear detector shares similar manufacturing processes as the TMR sensor and can be formed using many of the same processing steps used to form the TMR sensor itself. As a result, the added manufacturing time and costs associated with adding a dedicated noncorrosive smear detector to a slider is minimal.

Figure 2:
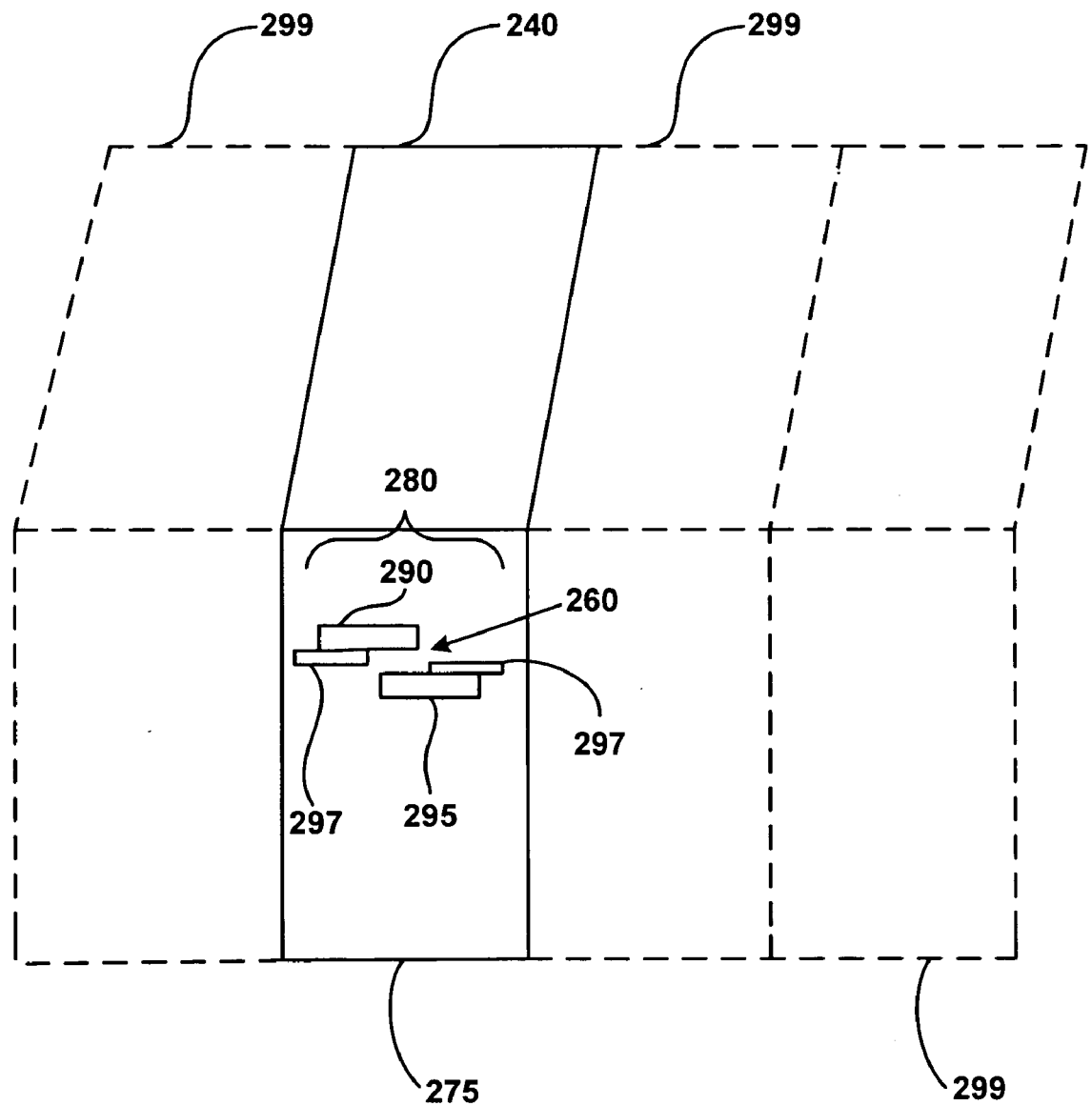
FIG. 2 is an illustration of an example row of sliders in accordance with embodiments of the present invention.

FIG. 2 is an illustration of an exemplary row of sliders 200 in accordance with embodiments of the present invention. Slider row 200 includes a plurality of sliders 299, however only slider 240 will be described for purposes of brevity and clarity. In one embodiment of the invention, not all of the sliders of the slider row 200 need a dedicated noncorrosive smear detector 280. For example, a single dedicated noncorrosive smear detector 280 may be associated with a plurality of individual sliders.

The dedicated noncorrosive smear detector 280 is exposed on lapping surface 275 of the slider row 200. In most cases, the lapping surface 275 is the air bearing surface of the sliders. The dedicated noncorrosive smear detector 280 includes conducting layers 290 and 295 that are separated by a gap 260. In one embodiment, chrome leads 297 are utilized within dedicated noncorrosive smear detector 280. FIG. 2 shows a current perpendicular plane (CPP) dedicated noncorrosive smear detector, however, it is appreciated that any type of sensor structures could be used in accordance with embodiments of the present invention.

As stated above, the dedicated noncorrosive smear detector 280 measures resistance. An infinite resistance exists when there is no smear. Since ohmmeters have difficulties with measurements such as an "infinite resistance", a resistance is placed in parallel with dedicated noncorrosive smear detector 280. When a smear occurs, the resistance of the combined devices will drop. For example, when debris (smearing) bridges the conducting plates 290 and 295, the resistance decreases, indicating a problem with the lapping process. In one embodiment, dedicated noncorrosive smear detector 280 is electrically monitored in real-time while the slider row is being lapped which provides instant feedback and enables quick response time to problems with the lapping process. It is appreciated that gap 260 has an insulating layer, not shown for clarity.

In one embodiment, the dedicated noncorrosive smear detector 280 is a current perpendicular plane (CPP) sensor, which can be formed concurrently with the TMR sensor. But the dedicated noncorrosive smear detectors may have less metal layers than the TMR sensors so that their insulating layers are thicker than the insulating barrier of the TMR sensors. This is necessary to bring their smearing sensitivity to the desired range to differentiate fine lapping from rough ones (TMR sensors are too sensitive).

Figure 3:
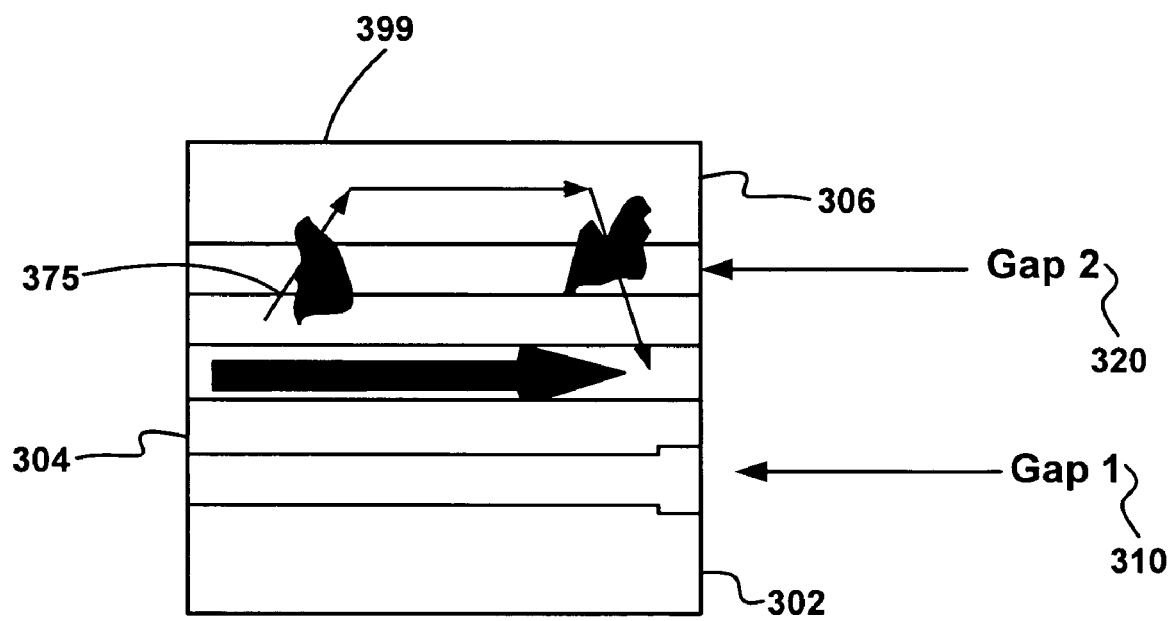
FIG. 3 is a cross sectional view of an example current in plane (CIP) dedicated noncorrosive smear detector in accordance with embodiments of the present invention.

FIG. 3 is a cross sectional view of an example current in plane (CIP) dedicated noncorrosive smear detector 300 in accordance with embodiments of the present invention. With a CIP dedicated noncorrosive smear detector 300, sensor stacks 302, 304 and 306 are electrically isolated by insulating layers 310 and 320 of approximately 10 nanometers each, forming "gaps" 310 and 320.

Conducting debris 399 (e.g., smearing) that covers the "gap" will cause current shunting 375 and will be reflected as downward resistance of CIP dedicated noncorrosive smear detector 300. It is worth noting that it takes two smears across the gap to cause a downward resistance to occur within CIP dedicated noncorrosive smear detector 300. It is appreciated that the insulating layer or "gap" could be in the range of 5-40 nanometers, but could also be larger or smaller, depending on many factors, such as desired sensitivity of CIP dedicated noncorrosive smear detector 300 to smearing. The smaller the "gap" the more sensitive CIP dedicated noncorrosive smear detector 300 will be to smearing.

Figure 4:
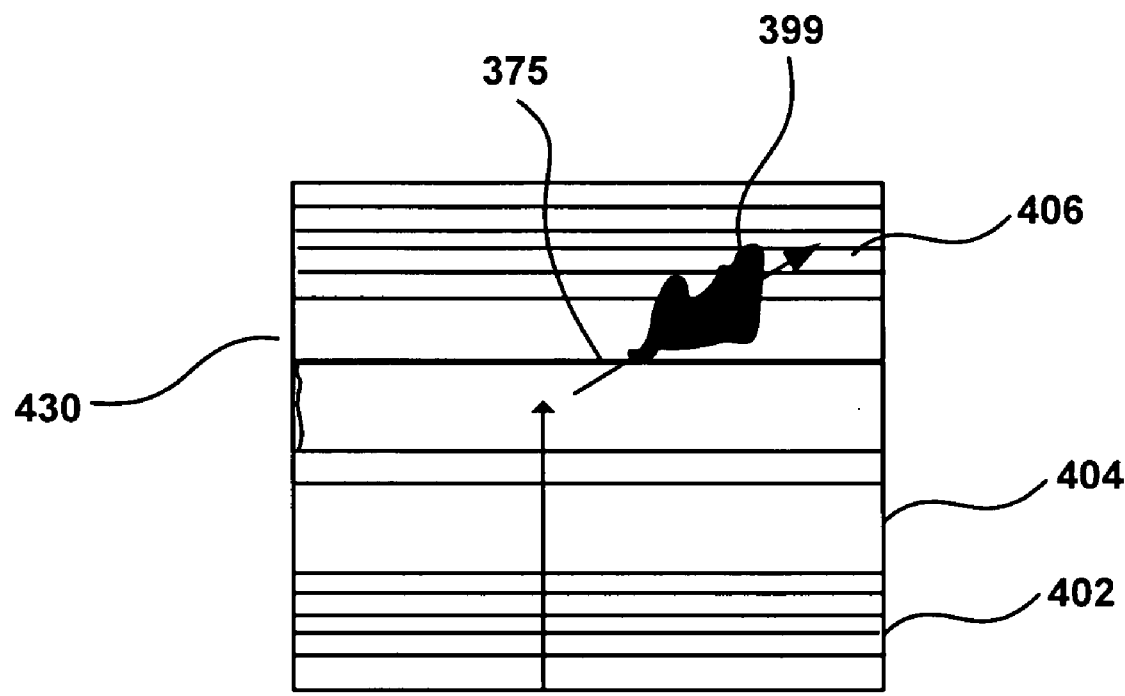
FIG. 4 is a cross sectional view of an example current perpendicular plane (CPP) dedicated noncorrosive smear detector in accordance with embodiments of the present invention.

In another embodiment of the invention, the dedicated noncorrosive smear detector 280 is a current perpendicular plane (CPP) sensor, which can be formed concurrently with the TMR sensor. FIG. 4 is a cross sectional view of an example current perpendicular plane (CPP) dedicated noncorrosive smear detector 400 in accordance with embodiments of the present invention. The CPP stack (402 and 404) is separated from the shield metal 406 with a gap 430 of approximately 10 nanometers. This large gap will limit the current flow, thus the resistance will be very large.

However, once the debris 399 (smearing) is bridged across the gap 430, the resistance will drop drastically because of current shunting 375. From the resistance values of the CCP dedicated noncorrosive smear detector 400, a smear index can be determined. It is appreciated that the insulating layer or "gap" 430 could be in the range of 5-20 nanometers, but could also be larger or smaller, depending on many factors, such as the desired sensitivity of the CPP device to smearing. The smaller the "gap" the more sensitive CPP dedicated noncorrosive smear detector 400 will be to smearing.

Although CIP 300 and CPP 400 dedicated noncorrosive smear detectors are described herein as dedicated slider noncorrosive smear detectors, it is appreciated that any number of sensor configurations can be used in accordance with embodiments of the present invention. For example, a number of sensors could be wired together to enable measurement of smear.

Figure 5:
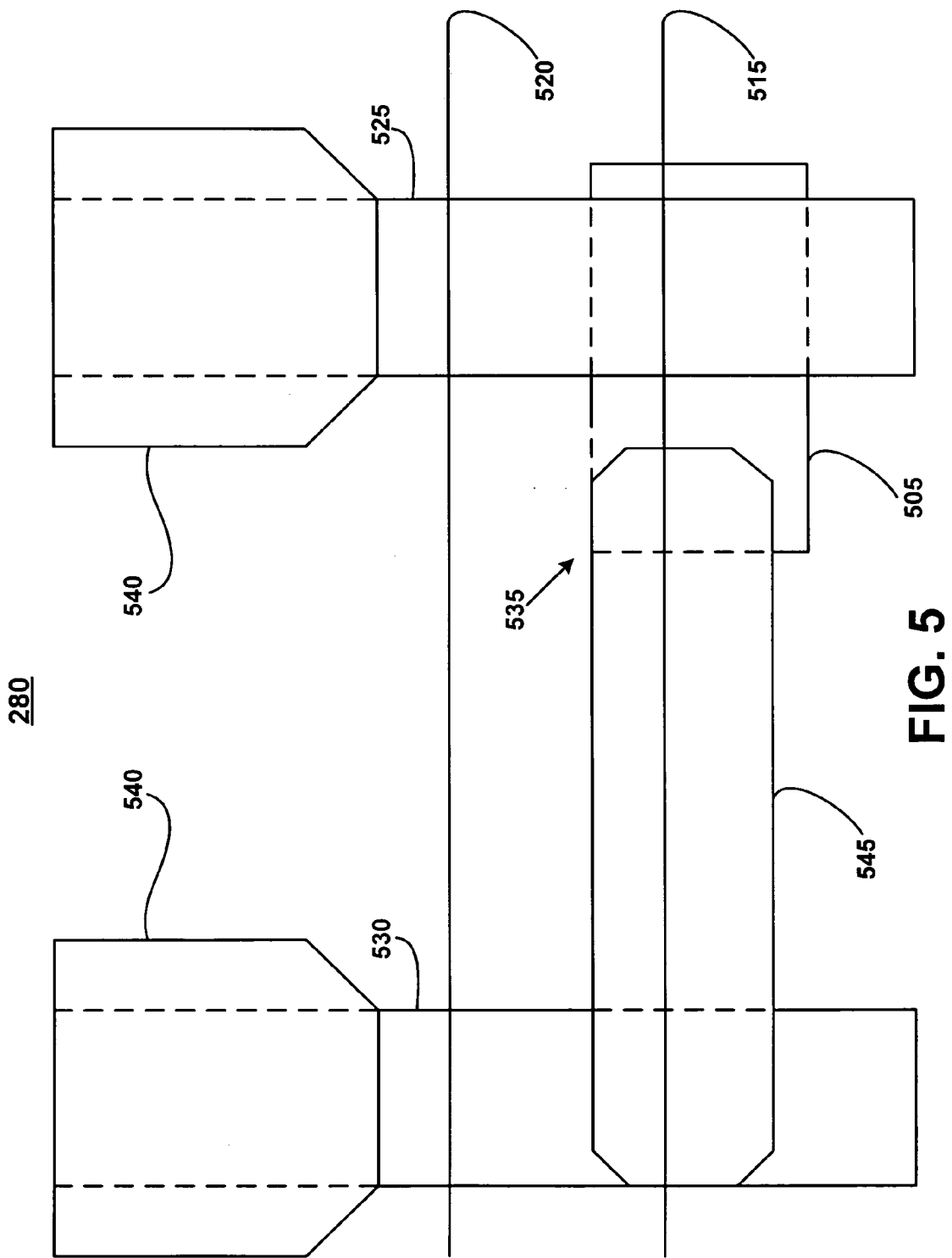
FIG. 5 is an example dedicated noncorrosive smear detector associated with electrically conductive material coupled therewith in accordance with embodiments of the present invention.

FIG. 5 is an example dedicated noncorrosive smear detector 280 associated with electrically conductive material coupled therewith in accordance with embodiments of the present invention. Dedicated noncorrosive smear detector 280 includes first shield 505, first lead 525, second lead 530, and second shield 545. First lead 525 and second lead 530 are configured to enable electrically conductive material 540 to be coupled therewith. Also shown is air bearing surface (ABS) 515 and deep gap mill surface (DGMS) 520. In one embodiment, portions of dedicated noncorrosive smear detector 280 are removed during the lapping process. When these portions are removed at the ABS, the remaining portions of dedicated noncorrosive smear detector 280 that are exposed are noncorrosive.

First shield 505 and second shield 545 are part of the recording head itself and are composed of thick nickel iron layers that are typically about 1 micron thick. They are very malleable. First shield 505 and second shield 545 have a function in the read head. As dedicated noncorrosive smear detector 280 is built, first shield 505 and second shield 545 are used in dedicated noncorrosive smear detector 280. First shield 505 and second shield 545 are part of the malleable metal that may smear across gap 535, ultimately providing indications regarding the quality of the lapping plate.

A hard magnet may be placed next to gap 535. The hard magnet may be a cobalt based material, such as but not limited to a cobalt platinum alloy. The hard magnet can also smear, just like first shield 505 and second shield 545. The hard magnet may also corrode.

First lead 525 and second lead 530 can be chrome, but may be composed of any reasonably conductive material that meets lifetime corrosion requirements, such as but not limited to tantalum or gold. First lead 525 and second lead 530 can be deposited coincident with the electronic lapping guide (ELG) lead process, since both sets of leads must meet equivalent lifetime corrosion requirements. Additionally, there is gap 535, which is located between the overlay of first shield 505 and second shield 545. It is appreciated that gap 535 is also identifiable as gap 260 of FIG. 2.

Electrically conductive material 540 may be composed of copper, gold, or some other type of electrically conductive material. It is appreciated that electrically conductive material 540, first lead 525, and second lead 530 are equivalent to conducting layers 290 and 295 as described in FIG. 2. Electrically conductive material 540 need only be composed of highly conductive material and may be corrosive material such as Copper. Gold, which is both very conductive and noncorrosive is also an alternative to Copper. The purpose of electrically conductive material 540 is to bring the electrical connection a long distance from gap 535 to the back of the slider for subsequent electrical connection to instrumentation (not shown).

FIG. 8 is a flow diagram of an example method 800 for constructing dedicated noncorrosive smear detector 280 in accordance with embodiments of the present invention.

At 805, method 800 includes locating a back edge of first shield 505 in the gap between ABS 515 and DGMS 520. For example, referring to FIG. 8 and to FIG. 5, the back edge of first shield 505 is located between ABS 515 and DGMS 520. The depth at which the air bearing is milled into is generally about 1 to 2 microns, although it may be some other depth.

Thus, a smearable first metal layer, first shield 505, is built.
A back edge is formed between ABS 515 and DGMS 520. A gap between ABS 515 and DGMS 520 is formed. Then a smearable second metal layer is built.

At 810, method 800 includes establishing first lead 525 and second lead 530 separated by gap 535, wherein first lead 525 and second lead 530 are configured to enable electrically conductive material 540 to be coupled therewith. For example, first lead 525 extends from below DGMS 520 through ABS 515. First lead 525 also connects with first shield 505. Furthermore, second lead 530 extends from below DGMS 520 through ABS 515. In one embodiment, first lead 525 and second lead 530 are composed of chrome. Milling occurs and part of the gap between ABS 515 and DGMS 520 is removed, to be filled with chrome.

In one embodiment, first lead 525 and second lead 530 have the electrically conductive material 540 of copper coupled therewith. Copper is very corrosive and in one embodiment is buried deep in the head. It is appreciated that the copper may be buried at any depth at which the copper does not become exposed after air bearing surface milling.

In one embodiment of the present invention, an insulator of alumina is used to cover and protect the electrical connection made between electrically conductive materials 540 and first lead 525, first shield 505, and second lead 530. However, the insulator neither covers what may be the existence of a hard magnet nor portions of second shield 545, in order that an electrical connection may be made across gap 535. In one embodiment, the purpose of the insulator's presence it to protect first lead 525 and second lead 530 from subsequent processing.

At 815, method 800 includes bridging gap 535 by second shield 545, wherein a back edge of second shield 545 is located between ABS 515 and DGMS 520. Second shield 545 touches first shield 515 as well as second lead 530.

During lapping, the smearing of the metals (first shield 505, hard magnet 510, and second shield 545) across gap 535 becomes conductive. When gap 535 exists between first lead 525 and second lead 530, there exists some measurable resistance. This measurable resistance may be measured by an Ohmmeter connected to lead structures (first lead 525 and second lead 530). However, when first shield 505 and second shield 545 smear across gap 535, this smearable material becomes conductive, and the measurable resistance decreases.

For example, an Ohmmeter (or some other device capable of measuring resistance) connected with the electrically conductive material 540 is able to measure the current which travels through dedicated noncorrosive smear detector 280. This current travels from first lead 525, through first shield 505, the second shield 545, to second lead 530, only if smearing occurs. If smearing does not occur, then gap 535 remains present, creating a measurable resistance. Ultimately, a decreasing resistance would indicate an increase in smearing, and that the quality of the lapping plate is compromised.

The electrically conductive material 540 with which an Ohmmeter is connected is usually a highly corrosive material such as copper. However, by deeply burying electrically conductive material 540 below DGMS 520, electrically conductive material 540 does not become exposed to oxygen during or after milling. Therefore, electrically conductive material 540 does not experience corrosion, which itself also may cause smearing within a head, and ultimately HDD failure.

Figure 6:
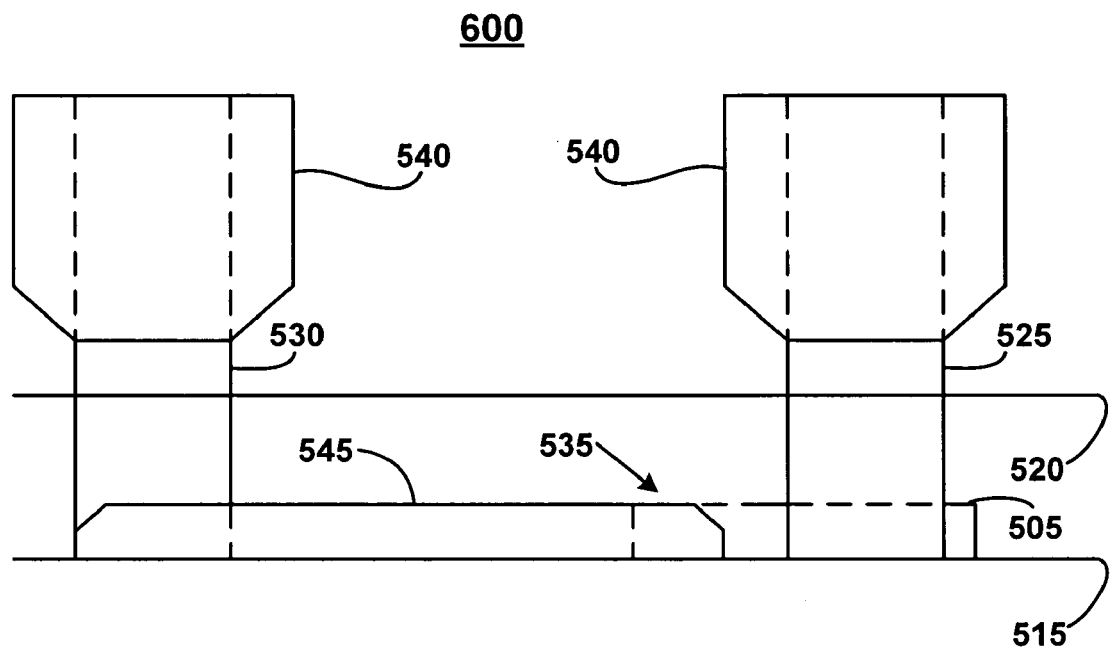
FIG. 6 is a drawing of the remaining metal of an example dedicated noncorrosive smear detector after lapping has occurred at the air bearing surface in accordance with embodiments of the present invention.

Referring now to FIG. 6, a drawing of the remaining metal of an example dedicated noncorrosive smear detector 280 after lapping has occurred at ABS 515 in accordance with embodiments of the present invention is shown. Fine lapping occurring at this point in the milling process, results in smearable remnants of noncorrosive pieces of first shield 505, and second shield 545, which bridge gap 535 between first lead 525 and second lead 530. When the lapping process is done, a smear across gap 535 as described herein may exist, allowing for measurement of a finite resistance (The measurement is related to the amount of smearing occurring.). This measurement is utilized to determine if new lapping plates are needed.

Figure 7:
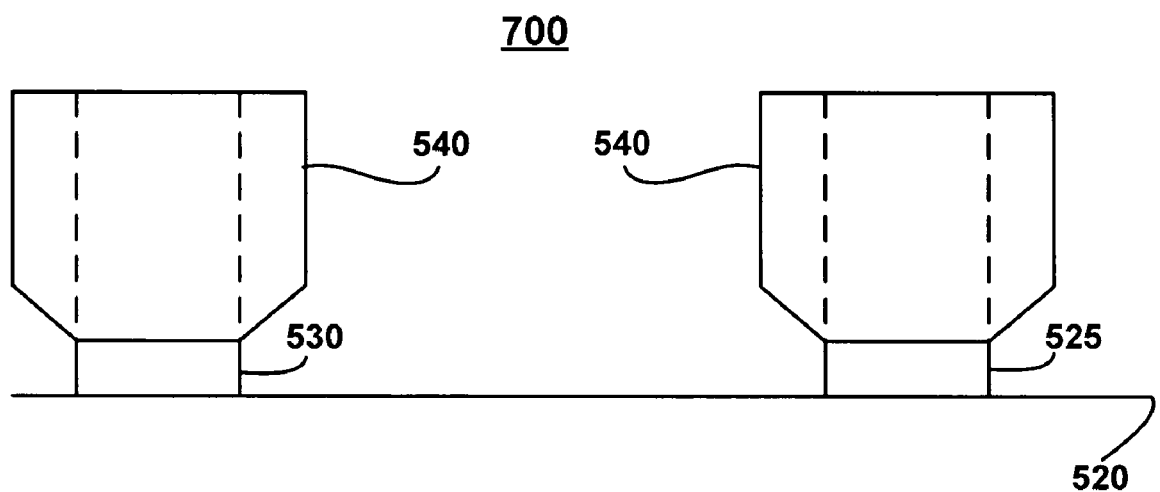
FIG. 7 is a drawing of the metal of an example dedicated noncorrosive smear detector after an air bearing surface milling in accordance with embodiments of the present invention.

Referring now to FIG. 7, a drawing of the metal of an example dedicated noncorrosive smear detector 280 after an ABS 515 milling in accordance with embodiments of the present invention is shown. All smearable remnants of noncorrosive pieces of first shield 505 and second shield 545 are milled away when the air bearing gets put on. Just a portion of dedicated noncorrosive smear detector is left remaining, that of first lead 525 and second lead 530. First lead 525 and second lead 530 are exposed at DGMS 520, but are noncorrosive.

FIG. 9 is a flow diagram of an example method 900 for determining a smear level associated with a slider in accordance with embodiments of the present invention. In one embodiment, method 900 is performed while a slider or a plurality of sliders are being lapped or are in a lapping process.

At 905, method 900 includes measuring a resistance value associated with dedicated noncorrosive smear detector 280 associated with a tunnel magnetic recording device. In one embodiment, a CIP dedicated noncorrosive smear detector 300 or a CPP dedicated noncorrosive smear detector 400 is used to measure the resistance in 905.

At 910, method 900 includes determining a smear index value associated with the tunnel magnetic recording device while a lapping process is being performed wherein the smear index value is based on the resistance value of dedicated noncorrosive smear detector 280. During lapping, the dedicated noncorrosive smear detectors 280 become shorter and their intrinsic resistance values increase monotonically with time. Any drop of measured resistance values are due to current shunting by smearing. The smear index, for example, can be defined as the percentage of the resistance drops (normalized by the pre-drop values) average over a certain period of time.

At 915, method 900 includes comparing the smear index value to a threshold smear index value. The threshold value is the maximum allowable level of smear. Once the threshold is exceeded, the lapping process should be adjusted.

At 920, method 900 includes in response to the smear index value is greater than the threshold value, determining the lapping process requires an adjustment. It is appreciated that 920 can result in performing any necessary repairs and/or adjustments associated with the lapping process. For example, 920 can trigger changing lapping plates, adjusting lapping speed, changing slurry mixtures, etc. in accordance with embodiments of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A disk drive slider comprising:
a tunnel magnetic resistance device; and
a dedicated noncorrosive smear detector for measuring resistance, said resistance corresponding to a level of smear associated with said disk drive slider, said dedicated noncorrosive smear detector comprising:
a first shield, a back edge of said first shield located between an air bearing surface (ABS) and a deep gap mill surface (DGMS);
a first lead and a second lead separated by a gap, said first lead coupled with said first shield, wherein said first and second lead are configured to enable electrically conductive material to be coupled therewith; and
a second shield having a back edge between said ABS and said DGMS, said second shield configured to couple with said first shield and said second lead such that a lapping process creates a smear surface of noncorrosive material.

2. The disk drive slider as described in claim 1 wherein said dedicated noncorrosive smear detector is used to determine said level of smear while simultaneously lapping said disk drive slider.

3. The disk drive slider as described in claim 1 wherein said dedicated noncorrosive smear detector includes a current in plane (CIP) sensor.

4. The disk drive slider as described in claim 1 wherein said dedicated noncorrosive smear detector includes a current perpendicular plane (CPP) sensor.

5. The disk drive slider as described in claim 1 wherein said dedicated noncorrosive smear detector includes an electrical coupling mechanism for electrically coupling said dedicated noncorrosive smear detector to a lapping control device.

6. The disk drive slider as described in claim 1 wherein said dedicated noncorrosive smear detector includes an insulating gap, said insulating gap in a range of 5-15 nanometers.

7. The disk drive slider as described in claim 1, wherein said first and second lead are configured to enable electrically conductive material to be coupled therewith below said DGMS.

8. A disk drive assembly comprising:
a rotatable magnetic disk; and
a head gimbal assembly coupled to an actuator, said head gimbal assembly comprising a head slider, said slider comprising:
a tunnel magnetic resistance device; and
a portion of a dedicated noncorrosive smear detector formed within said head slider for measuring resistance, said resistance corresponding to a level of smear associated with said head slider, wherein an exposed surface of said portion of said dedicated noncorrosive smear detector is exposed on an air bearing surface (ABS) of said head slider, wherein said portion of said dedicated noncorrosive smear detector is formed from:
- a first shield, a back edge of said first shield being located between said ABS and a deep gap mill surface (DGMS);
- a first lead and a second lead separated by a gap, said first lead coupled with said first shield, wherein said first and second lead are configured to enable electrically conductive material to be coupled therewith; and
- a second shield having a back edge between said ABS and said DGMS, said second shield configured to couple with said first shield and said second lead such that a lapping process creates a smear surface of noncorrosive material.

9. The disk drive assembly as described in claim 8 wherein said dedicated noncorrosive smear detector is used to determine said level of smear while simultaneously lapping said head slider.

10. The disk drive assembly as described in claim 8 wherein said dedicated noncorrosive smear detector includes a current in plane (CIP) sensor.

11. The disk drive slider as described in claim 8, wherein said first and second lead are configured to enable electrically conductive material to be coupled therewith below said DGMS.

12. The disk drive assembly as described in claim 8 wherein said dedicated noncorrosive smear detector includes an insulating gap, said insulating gap in a range of 5-40 nanometers.

13. A method for determining a level of smear associated with a tunnel magnetic resistance device comprising:
measuring a resistance value associated with a dedicated noncorrosive smear detector associated with said tunnel magnetic resistance device, wherein said dedicated noncorrosive smear detector comprises:
- a first shield, a back edge of said first shield located between an air bearing surface (ABS) and a deep gap mill surface (DGMS);
- a first lead and a second lead separated by a gap, said first lead coupled with said first shield, wherein said first and second lead are configured to enable electrically conductive material to be coupled therewith; and
- a second shield having a back edge between said ABS and said DGMS, said second shield configured to couple with said first shield and said second lead such that a lapping process creates a smear surface of noncorrosive material; and determining a smear index value associated with said tunnel magnetic resistance device while a lapping process is being performed wherein said smear index value is based on said resistance value.

14. The method as described in claim 13 further comprising: comparing said smear index value to a threshold smear index value.

15. The method as described in claim 14 further comprising:
in response to said smear index value being greater than said threshold smear index value, determining if said lapping process requires an adjustment.

16. The method as described in claim 13 further comprising:
controlling said lapping process based on said resistance value associated with said dedicated noncorrosive smear detector.

17. A method for constructing a dedicated noncorrosive smear detector, comprising:
locating a back edge of a first shield between an air bearing surface (ABS) and a deep gap mill surface (DGMS);
establishing a first lead and a second lead separated by a gap, wherein said first and second lead are configured to enable electrically conductive material to be coupled therewith; and
bridging said gap by a second shield, wherein a back edge of said second shield is located between said ABS and said DGMS, wherein said second shield is configured to couple with said first shield and said second lead such that a lapping process creates a smear surface of noncorrosive material.

18. The method of claim 17, further comprising:
extending said first lead from below said DGMS through said ABS and coupling with said first shield, and extending said second lead from below said DGMS through said ABS.

* * * * *